United States Patent
Matsumoto et al.

(10) Patent No.: US 6,792,186 B2
(45) Date of Patent: Sep. 14, 2004

(54) LIGHT FIBERS AND METHODS FOR PRODUCING THE SAME

(75) Inventors: Kenji Matsumoto, Kanagawa Pref (JP); Kengo Imamura, Ebina (JP); Shinichi Irie, Yamato (JP)

(73) Assignee: 3M Innovative Properties Company, Saint Paul, MN (US)

( * ) Notice: Subject to any disclaimer, the term of this patent is extended or adjusted under 35 U.S.C. 154(b) by 46 days.

(21) Appl. No.: 10/168,589

(22) PCT Filed: Dec. 15, 2000

(86) PCT No.: PCT/US00/34083
§ 371 (c)(1),
(2), (4) Date: Jun. 21, 2002

(87) PCT Pub. No.: WO01/47696
PCT Pub. Date: Jul. 5, 2001

(65) Prior Publication Data
US 2003/0002835 A1 Jan. 2, 2003

(30) Foreign Application Priority Data
Dec. 28, 1999 (JP) .............................. 11-374958

(51) Int. Cl.[7] .................................................. G02B 6/16
(52) U.S. Cl. ................... 385/123; 385/143; 65/379; 65/381
(58) Field of Search ............................... 385/123, 125, 385/140–143

(56) References Cited

U.S. PATENT DOCUMENTS

| | | |
|---|---|---|
| 4,704,660 A | 11/1987 | Robbins |
| 4,782,430 A | 11/1988 | Robbins |
| 4,957,347 A | 9/1990 | Zarian |
| 5,052,778 A | 10/1991 | Jamshid |
| 5,067,831 A | 11/1991 | Robbins |
| 5,122,580 A | 6/1992 | Zarian |
| 5,149,467 A | 9/1992 | Zarian |
| 5,221,387 A | 6/1993 | Robbins |
| 5,225,166 A | 7/1993 | Zarian |
| 5,298,327 A | 3/1994 | Zarian |
| 5,684,913 A * | 11/1997 | Sugiyama et al. .......... 385/143 |
| RE36,157 E | 3/1999 | Robbins |
| 5,898,810 A | 4/1999 | Devens, Jr. |
| 5,903,695 A | 5/1999 | Zarian |
| 5,937,127 A | 8/1999 | Zarian |
| 5,987,199 A | 11/1999 | Zarian |
| 6,251,311 B1 | 6/2001 | Zarian |
| 6,282,355 B1 | 8/2001 | Zarian |
| 6,289,150 B1 | 9/2001 | Zarian |
| 6,363,197 B1 | 3/2002 | Zarian |

FOREIGN PATENT DOCUMENTS

| | | |
|---|---|---|
| JP | 57045502 | 3/1982 |
| JP | 2306205 | 12/1990 |
| JP | 07168029 | 4/1995 |
| JP | 7168028 | 7/1995 |
| WO | WO 99/59804 | 11/1999 |

* cited by examiner

Primary Examiner—Hemang Sanghavi
Assistant Examiner—Eric Wong
(74) Attorney, Agent, or Firm—Stephen W. Buckingham

(57) ABSTRACT

A light fiber comprising (a) a tubular clad having a predetermined length and (b) a solid core formed by reacting a filler material with which the clad is filled, the clad and the core being closely contacted with each other by shrinkage of the clad, characterized in that: the clad is expandable under pressure, shrinkage of the clad is initiated before the completion of the reaction of the filler material and is carried out in conformity with volume reduction of the core, which accompanies the reaction of the filler material, and the number of air gap between the clad and the core, which is measured per length of 10 m, is 3 or less.

2 Claims, 1 Drawing Sheet

LIGHT FIBERS AND METHODS FOR PRODUCING THE SAME

TECHNICAL FIELD

The present invention relates to a light fiber and a method of producing the same and, more particularly, to a light fiber comprising (a) a tubular clad having a predetermined length, which is expandable under pressure and (b) a solid core formed by reacting a filler material with which the clad is filled, the clad and the core being closely contacted with each other by shrinkage of the clad, and a method of producing the same, particularly a method of producing a light fiber, capable of effectively preventing generation of air gap between the clad and the core.

BACKGROUND OF THE INVENTION

There has been known a method of filling a tubular clad with a polymerizable monomer capable of forming a solid core after the completion of the reaction (particularly polymerization reaction), and polymerizing the monomer to produce a light fiber. In case the light fiber is produced by such a method, it is usually important to substantially prevent air gap (also referred to as an internal defect) such as cellular defect, peel or the like from generating between the core and the clad (interface). Since such air gap lowers the light transmission efficiency of the light fiber, it becomes impossible to transfer light incident upon the core from one end to the other end with a sufficient dose of light in the comparatively long size light fiber (having a length of 20 m or more).

As the method of producing the light fiber, capable of inhibiting generation of such air gap as possible, for example, a method of filling with a monomer under pressure (disclosed in Japanese Unexamined Patent Publication (KOKAI) No. 57-45502), a method of successively polymerizing a monomer from one end to the other end (disclosed in Japanese Unexamined Patent Publication (KOKAI) No. 7-168029) and a method of polymerizing a monomer while applying a pressure in an axial direction of a clad (disclosed in Japanese Unexamined Patent Publication (KOKAI) No. 7-168028). There is also known a method of covering a previously thermally-expanded clad with a jacket, polymerizing a monomer, removing the jacket, and shrinking the clad by applying heat (disclosed in Japanese Unexamined Patent Publication (KOKAI) No. 2-306205). In the above mentioned successive polymerization method, there is usually employed a so-called batch-wise manufacturing system of filling a tubular clad, whose one end is sealed, with a monomer under pressure, fixing the clad filled with the monomer in a heating bath, and polymerizing the monomer by heating. At this time, the monomer is polymerized successively from one end to the other end by raising a heating temperature (i.e. temperature of the heating medium in the heating bath).

The formers of a series of methods described above, i.e. three methods utilizing filling with monomer under pressure, successive polymerization and axial pressurization of clad, have an effect of preventing generation of air gap at the interface between the core whose volume was reduced by polymerization, and the clad, by filling with the monomer in the amount corresponding to the volume reduction, occurred on polymerization, from the unpolymerized side.

On the other hand, the latter method has an effect of thermally expanding a clad, reversibly, and shrinking an internal radius of the clad corresponding to an external diameter of the core whose volume was reduced after polymerization, thereby enhancing the adhesion between the core and the clad.

According to the former three methods among conventional methods described above, in case the region of interface between the unpolymerized portion where the monomer retains mobility and the polymerized portion where the monomer was solidified to lose the mobility is comparatively narrow (volume reduction of the monomer occurs only within a range where an influence of the pressure from the unpolymerized portion is exerted), it is possible to fill with the monomer in the amount corresponding to the volume reduction, occurred on polymerization, from the unpolymerized side. However, these methods are not effective for the case where the light fiber is continuously produced, for example, by the steps of:

(I) transferring a clad filled with a monomer to a heating region such as temperature-controlled bath using a feeding means, (II) initiating, carrying out and completing the reaction of the monomer in the heating region, and (III) passing the resulting light fiber after the completion of the polymerization reaction through the heating region and winding the light fiber, using a winding means disposed outside the heating region. That is, in case the productivity is enhanced by increasing the polymerization reaction rate, it becomes impossible to obtain a sufficient monomer filling effect because the region of the interface between the unpolymerized portion and the polymerized portion (portion where the polymerization has been completed) forms a boundary portion having a certain width and the volume reduction of the monomer occurs at the portion where an influence of the pressure from the unpolymerized portion is not exerted. Accordingly, it is difficult to stably produce a light fiber which is substantially free from air gap (the number of air gap between the clad and the core, which is measured per length of 10 m, is 3 or less) in case of continuous production.

In case a batch-wise production of the light fiber is carried out by using such a method, shrinkage of the external diameter of the core is compensated by shrinkage of the core in the lengthwise direction, thereby making it difficult to produce a comparatively long size light fiber (having a length of 20 m or more).

On the other hand, in the method of covering a previously thermally-expanded clad with a jacket, completing the polymerization of a monomer, and removing air gap between the core and the clad, which accompanies the polymerization, by shrinkage of the clad with heating, the production process is complicated when continuous production is conducted. Also, in case of removing air gap, which has already been formed, in the continuous processing of a comparatively long size light fiber, there is a considerable fear that the gas from the air gap portion can not escape from the other end portion of the light fiber and is trapped in the halfway of the light fiber, resulting in formation of defects.

Thus, an object of the present invention is to provide a long size light fiber (having a length of 20 m or more), which is substantially free from air gap between the core and the clad and is superior in light transmission performance.

Another object of the present invention is to provide a method of producing a light fiber, capable of producing such a light fiber in a stable and easy manner.

SUMMARY OF THE INVENTION

According to the present invention, the problems described above can be solved by a light fiber comprising (a)

a tubular clad having a predetermined length and (b) a solid core formed by reacting a filler material with which the clad is filled, the clad and the core being closely contacted with each other by shrinkage of the clad, characterized in that:

the clad is expandable under pressure, shrinkage of the clad is initiated before the completion of the reaction of the filler material and is carried out in conformity with volume reduction of the core, which accompanies the reaction of the filler material, and the number of air gap between the clad and the core, which is measured per length of 10 m, is 3 or less.

According to the present invention, there is also provided a method of producing a light fiber comprising (a) a tubular clad having a predetermined length and (b) a solid core formed by reacting a filler material filled in the clad, the clad and the core being closely contacted with each other by shrinkage of the clad, said method comprising the steps of:

forming the clad which is expandable under pressure, filling the clad with the filler material and reacting the filler material in the clad while applying a pressure, initiating a shrinking operation of the clad before the completion of the reaction of the filler material, and shrinking the clad with volume reduction of the core, which accompanies the reaction of the filler material, thereby inhibiting generation of air gap between the clad and the core.

DETAILED DESCRIPTION

Figure 1:
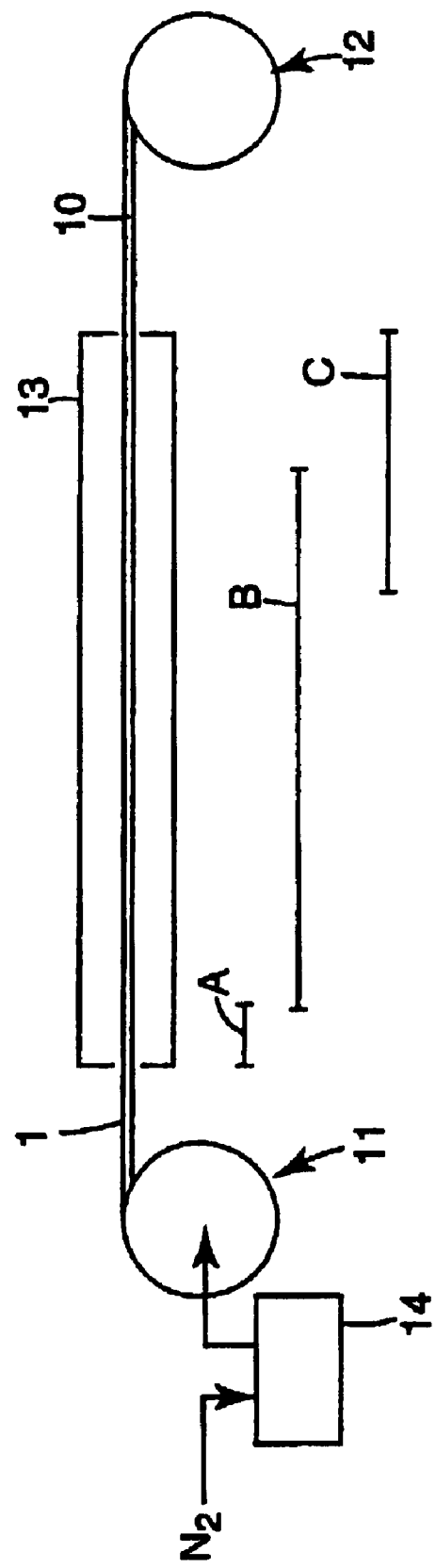
FIG. 1 is a schematic view showing one preferred embodiment of a production line of the light fiber according to the present invention.

The light fiber of the present invention is characterized in that:

the clad is expandable under pressure, shrinkage of the clad is initiated before the completion of the reaction of the filler material and is carried out with volume reduction of the core, which accompanies the reaction of the filler material, and the number of air gap between the clad and the core, which is measured per length of 10 m, is 3 or less. As is easily understood from the following description, these characteristics are particularly derived from the method of producing the light fiber according to the present invention.

According to the present invention, in the step of forming a solid core by polymerizing a filler material such as monomer in a tubular clad while applying a pressure, a shrinking operation of the clad is initiated before the completion of the reaction of the core (monomer), and then the clad is shrunk with volume reduction of the core, which accompanies the reaction of the filler material, thereby inhibiting generation of air gap between the clad and the core. That is, according to the method of the present invention, the light fiber is produced in the state where the filler material such as monomer is always closely contacted with the core formed by polymerizing the filler material and the clad. Therefore, it is possible to produce a light fiber, which is substantially free from air gap between the clad and the core, in a stable and easy manner even in case of continuous production.

As used herein, "the state which is substantially free from air gap" means that the number of air gap between the clad and the core, which is measured per length of 10 m, is 3 or less. The number of air gap is preferably 2 or less, and usually 1 or less. The air gap is a defect which can be visually recognized in case of incidence of light upon the fiber (core), and the maximum size is usually 5 mm or more.

As used herein, "the maximum size" refers to a diagonal line in case of a defect in a generally polygonal shape, and a major axis in case of a defect in a generally elliptical shape. The method of measuring the defect is preferably a method of counting those which can be visually recognized as a dark spot on the fiber side in case of incidence of light from one end of the light fiber.

The clad used in the light fiber of the present invention is a tubular one which has a predetermined length and is expandable under pressure. Accordingly, it can be easily shrunk with volume reduction of the core, which accompanies the reaction of the filler material. Such a clad is preferably made of a material which is expandable by causing plastic or elastic deformation at a predetermined temperature (e.g. reaction initiating temperature of filler material) under pressure and is thermally expandable by causing plastic or elastic deformation at a heating temperature at which the filler material is reacted.

Selection of the clad as described above is preferably conducted by appropriately deciding values of main physical properties, i.e. thickness of clad, internal radius of clad and elastic modulus of clad material, according to the pressure for pressurizing the filler material in the clad and temperature (temperature of polymerization bath) at which the filler material is reacted.

In other words, since expansion of the clad and its shrinkage with volume reduction of the core, which accompanies the reaction, can be conducted in a secure and stable manner (uniformly) by controlling the conditions as described above, there can be produced a long size light fiber, which is substantially free from air gap between the core and the clad and is superior in light transmission performance, in a stable and easy manner.

According to the present invention, continuous production of the long size light fiber can be efficiently conducted. One method suited for continuous production is a method described below. That is, it is a method of continuously producing a light fiber, comprising the steps of:

(A) feeding a clad from a feeding means, on which the clad is wound, using winding means, thereby transferring a filler material (polymerizable monomer), with which the clad is filled, to a heating region, said clad extending continuously in a lengthwise direction so that it can be fed and wound, (B) initiating, carrying out and completing the reaction of the filler material in the heating region, (C) initiating a shrinkage operation of the clad in the heating region, and (D) winding the resulting light fiber after the shrinking operation of the clad has substantially been completed, using a winding means disposed outside the heating region.

This method and a conventional batch-wise method are substantially the same in that a polymerization bath having a predetermined length, which includes as the heating region a heating medium such as water, is used. However, according to the above production method, the polymerization reaction operation of the monomer and the shrinking operation of the clad can be effectively conducted, simultaneously, by continuously passing the clad filled with the monomer through the heating region along the lengthwise direction of the polymerization bath, thereby making it possible to continuously product a long size light fiber, which is substantially free from air gap and is superior in light transmission performance, in a stable and easy manner. According to the this method, since the light fiber can be produced by using a clad having a length of 100 m or more, the productivity can be easily enhanced. From such a point of view, it is preferred that the clad filled with the filler material is fed to the heating region while the clad is continuously filled with the filler material under pressure, and then continuously reacted.

In the light fiber produced in the method of the present invention, it is very easy to reduce the number of air gap between the clad and the core, which is measured per length of 10 m, to 3 or less by shrinkage of the clad with volume reduction of the core, which accompanies the reaction of the filler material.

In case light is transmitted from one end to the other end, the light fiber can have sufficient light transmission performance for practical use if the number of air gap is 3 (per 10 m) or less. In case the light fiber is used for decoration utilizing light to be leaked from the fiber side, the number of air gap is 1 (per 10 m) or less. The light fiber according to the present invention can have sufficient light transmission performance for practical use in case of a product having a continuous core of 20 to 100 m.

Next, the light fiber according to the present invention as well as preferred method and conditions for production thereof will be described in detail.

[Method of Producing Light Fiber]

Preferred method of producing a light fiber according to the present invention will be described in a stepwise manner.

First, a tubular clad (clad tube) is prepared. Usually, the clad is formed by an extrusion molding method so as to have a predetermined size such as thickness, internal radius, length or the like. The material and size of the clad will be described hereinafter.

The clad 1 formed as described above is usually set to a feeding apparatus 11 as a feeding means, as shown in FIG. 1. The feeding apparatus 11 shown in the drawing is equipped with a rotatably disposed core tube (not shown) and is set after winding around the core tube. The clad 1 set to the core tube of the feeding apparatus is usually wound by driving a winding apparatus 12 bas a winding means, as shown in the drawing. The winding apparatus 12 shown in the drawing is equipped with a rotatably disposed core tube (not shown) and a driving means (e.g. motor, not shown) for rotating the core tube.

Using the feeding apparatus 11 and the winding apparatus 12, as shown in the drawing, in combination, the clad 1 extending continuously in the lengthwise direction is fed to a heating bath 13 (water bath for polymerization in the embodiment shown in the drawing) disposed between the feeding apparatus 11 and the winding apparatus 12 at a predetermined feed rate, and then passed through the bath.

The heating bath 13 is usually equipped with a container capable of being filled with a heating medium such as water, oil, air or the like, a heating means (e.g. heater) for heating the heating medium, and a temperature controlling apparatus (e.g. thermostat) for controlling the temperature of the heating medium. The clad and the monomer can also be heated by far infrared rays, microwave or the like.

The container of the illustrated heating bath 13 (water bath for polymerization) is equipped with two opening portions so that the clad 1 can penetrate through the container. As shown in the drawing, one opening portion is located at a clad take-in feed end (feeding apparatus side), whereas, the other opening portion is located at a clad take-out end (winding apparatus side). In place of the container as shown in the drawing, a container having an opening portion only at one end in the lengthwise direction of the container. In this case, the container is disposed along the generally vertical direction so that one opening of the container faces upward in the vertical direction. The clad is fed so that a sealed end of the clad enters from the opening portion and, after reversing the direction in the vicinity of the bottom (lower portion in the vertical direction) of the container, the sealed end comes out from the opening portion again. In such way, the clad filled with the monomer is dipped in a heating medium and, after the completion of formation of a core and shrinkage of the clad, a light fiber is taken out from the opening portion. Consequently, a long size light fiber can also be continuously produced.

As shown in the drawing, a monomer filling tank 14 containing a reactive filler material (polymerizable monomer in this embodiment) is prepared, and the clad 1 is filled with a polymerizable monomer as contents under the applied pressure of a nitrogen gas ($N_2$).

In case the light fiber is continuously produced while feeding and winding the clad extending continuously in the lengthwise direction, it is advantageous to continuously fill with the monomer under pressure, like the embodiment shown in the drawing. In case the clad is filled with the monomer under pressure in such way, one end of the clad in the lengthwise direction is usually sealed and the clad is filled with the monomer from the other end of the clad. The clad can be sealed by fitting a tap or valve made of glass, rigid plastic or metal (e.g. stainless steel) into the opening portion at one end of the clad.

On the other hand, the clad is filled with the monomer form the opening portion at the other end of the clad. As shown in the drawing, the clad is continuously filled with the monomer by bringing the opening portion at the other end of the clad 1 into contact with the monomer (usually in a liquid form) in the monomer tank 14 and maintaining the inside of the monomer tank 14 at the positive pressure. That is, such continuous filling under pressure can be conducted by bringing an inert gas such as nitrogen into contact with the liquid level of the monomer while dipping the other end of the clad in the liquid monomer.

Subsequently, the clad 1 is fed from the feeding apparatus 12, thereby feeding the monomer, with which the clad 1 is filled, to the heating region in the water bath 13 for polymerization. At this time, in case the temperature of the water bath 13 for polymerization is uniform and the water bath for polymerization is a temperature controlled bath which is controlled to the temperature suited for polymerization of the monomer and shrinkage of the clad, the whole water bath serves as the heating region.

The clad 1 filled with the monomer is passed through the water bath 13 for polymerization, for example, by connecting one end of a leading member such as wire, rope, tube or the like in the lengthwise direction to the sealed end of the clad, setting the other end of the leading member to the core tube of the winding apparatus 12, and driving the winding apparatus 12. Alternatively, the portion having a predetermined length, which extends from the sealed end of the clad 1 to one end in the opposite side, is allowed to serve as a waist portion and the waist portion can be utilized in place of the leading member.

In the embodiment shown in the drawing, the reaction (thermal polymerization) of the monomer is initiated in the clad fed into the heating region and the polymerization is completed in the heating region. On the other hand, the clad fed into the heating region is expanded by the pressure applied through the monomer. Since such a clad, which is expandable under pressure, is used, the clad can be uniformly shrunk with volume reduction, which accompanies the monomer reaction, by heating in the heating region before the completion of the reaction of the monomer.

In the illustrated embodiment, the feed rate and the heating temperature of the clad are decided so that the polymerization (thermal polymerization) of the monomer is completed in the water bath for polymerization (heating region). Consequently, the reacted (polymerized) portion of the clad is located in the water bath even after the completion of the reaction of the monomer, thereby making it possible to heat the reacted portion. The clad can be shrunk uniformly in the state of being closely contacted with the core by such a heating operation.

As described above, according to the production method of the illustrated embodiment, expansion of the clad, initiation and completion of the polymerization of the core (formation of solid core), and shrinkage of the clad can be conducted in a continuous and smooth manner. In the water bath 13 for polymerization, thermal expansion of the clad proceeds in the zone A and thermal polymerization of the core proceeds in the zone B and, furthermore, thermal shrinkage of the clad proceeds in the zone C.

The mechanism and effect of the shrinkage of the clad, which accompanies the polymerization of the monomer, can be described as follows.

1. The clad filled with the polymerizable monomer under pressure is expanded under pressure in the water bath for polymerization. The expansion operation of the clad can be conducted in an easy and uniform manner by heating.

2. The polymerization of the expanded polymerizable monomer in the clad is initiated by heating. Volume reduction of the monomer during the polymerization, which occurred at the initial stage of the polymerization, can be compensated by the monomer to be moved from the unpolymerized portion by the pressure applied to the unpolymerized portion of the monomer.

3. When the polymerization of the monomer proceeds and the fluidity (mobility) is lost, the monomer whose mobility was lost forms a wall against the pressure. The portion extending further from the wall (discharge side of water bath) becomes a region where an influence of the pressure from the unpolymerized portion is not exerted.

4. Until the polymerization is completed, volume reduction of the core, which accompanies the polymerization reaction, continues. At this stage, since filling with the monomer from the unpolymerized portion side is inhibited by the wall, volume reduction occurs in the radial direction of the core. At this stage, the clad expanded under pressure is shrunk with volume reduction of the core and is closely contacted with the core. At this time, heating of the clad in the water bath makes the shrinking operation of the clad uniform and smooth. Accordingly, air gap can be effectively prevented.

The fiber 10 thus obtained after the completion of formation of the solid core and shrinkage of the clad is fed to the winding apparatus 12, which is disposed outside the heating region 13 (water bath for polymerization), where the fiber is wound. The light fiber 10 fed between the water bath 13 for polymerization and the winding apparatus 12 is usually cooled slowly by an air in the production room.

When the heating temperature in the water bath for polymerization is comparatively high (e.g. 75° C. or higher), it is preferred to wind by the winding apparatus after passing through the slow-cooling region whose temperature is set at a predetermined temperature. When the heating temperature in the water bath is comparatively high, it becomes impossible to neglect thermal expansion of the solid core after the completion of the reaction, thereby making it possible to shrink the clad with shrinkage, which accompanies cooling of the core. As the slow-cooling region of the clad, the region of room temperature (usually 25° C.) can be used by providing a long distance between the water bath and the winding apparatus, or an oven disposed between the water bath and the winding apparatus can be employed. The temperature of the oven is usually set within a range from the heating temperature and room temperature.

The clad in the water bath for polymerization is preferably retained in a generally linear form. That is, a line connecting the clad feed end and the discharge end of the water bath container is generally a straight line. Consequently, it becomes easier to uniformly shrink the clad with volume reduction of the core made of a polymer of a monomer, which accompanies the reaction of the monomer. The light fiber produced by such a method can be substantially free from air gap between the clad and the core.

According to the method of the present invention, there can be produced efficiently a long size light fiber, which is substantially free from cellular defect, peel or the like, without using a special operation or step for volume reduction compensation of the reacted monomer (polymerized monomer).

[Conditions for Production of Light Fiber]

As described above, according to the production method of the present invention, by controlling main production conditions, i.e. thickness of the clad, internal radius of the clad, physical properties of the clad, such as elastic modulus of clad material, pressure in the clad (pressure for pressurizing the filler material such as monomer) and temperature of the heating bath (water bath for polymerization) in the step of polymerizing the monomer in the clad, which is expandable under pressure, the clad is deformed (plastic deformation or elastic deformation) on the polymerization reaction and the polymerization reaction of the monomer can be conducted in the expanded clad. By controlling the above-described production conditions, the clad can be shrunk with volume reduction of the core, which accompanies the reaction of the filler material, thereby making it possible to enhance the adhesion between the core and the clad.

The production conditions are preferably decided as follows.

(a) Expansion of the clad is controlled by appropriately deciding the temperature in the vicinity of the fed port of the clad, physical properties of the clad and internal radius of the clad. Expansion of the clad is decided within a range from volume reduction, which accompanies the polymerization reaction of the monomer, to burst limit of the clad.

(b) The pressure in the clad is set so that volume reduction caused by the initial polymerization of the core can be compensated by the unpolymerized monomer.

(c) The temperature in the vicinity of the clad discharge port of the heating bath is decided so that the expanded clad can be shrunk with volume reduction of the core occurred in the radial direction in uniform and smooth manner. Physical properties of such clad are also set within a range where such clad shrinkage can be conducted.

One embodiment of specific production conditions will be described below.

The elastic modulus of the clad material is usually from 10 to 700 MPa, preferably from 20 to 600 MPa, and particularly preferably from 30 to 500 MPa. When the elastic modulus is too small, there is a fear that the clad bursts in the production process if the clad internal pressure is enhanced, thereby making it difficult to enhance the pressure in the clad. When the pressure in the clad is not sufficiently enhanced, it becomes difficult to make expansion of the clad larger than volume reduction of the core, which accompanies the polymerization reaction of the monomer, and there is a fear that the clad can not be shrunk with volume reduction of the core, which accompanies the polymerization reaction. To the contrary, when the elastic modulus is too large, expansion of the clad under pressure can not be increased sufficiently and there is a fear that the clad can not be shrunk with volume reduction of the core, which accompanies the polymerization reaction of the monomer. In the present specification, the elastic modulus of the clad material is defined as a value at the heating temperature on an expanding operation under pressure.

The thickness of the clad is usually from 0.01 to 2 mm, preferably from 0.05 to 1.5 mm, and particularly preferably from 0.1 to 1 mm. When the thickness is too small, there is a fear that the clad bursts if the pressure in the clad is sufficiently enhanced, thereby making it difficult to enhance the pressure in the clad. To the contrary, when the thickness is too large, there is a fear that it becomes difficult to expand the clad under pressure, thereby making it impossible to shrink the clad with volume reduction, which accompanies the polymerization reaction of the monomer.

The internal radius of the clad is usually from 1 to 15 mm, preferably from 1.5 to 13, and particularly preferably from 2 to 12 mm. When the internal radius is too small, there is a fear that it becomes difficult to expand the clad under pressure, thereby making it impossible to shrink the clad with volume reduction, which accompanies the polymerization reaction of the monomer. To the contrary, when the internal radius is too large, there is a fear that it becomes difficult to enhance the pressure in the clad, thereby making it impossible to effectively prevent generation of air gap in the initial stage of the polymerization of the monomer.

The material of the clad is not specifically limited as far as it is a material having the elastic modulus as described above. Examples thereof are polymers such as tetrafluoroethylene-hexafluoropropylene copolymer, tetrafluoroethylene-hexafluoropropylene-vinylidene fluoride copolymer, trifluoroethylene-vinylidene fluoride copolymer, polymethylpentene, ethylene-vinyl acetate copolymer, vinyl acetate-vinyl chloride copolymer and the like.

The upper limit of the pressure in the clad varies depending on physical properties of the clad, but is usually 5 MPa, preferably 3 MPa, and particularly preferably 2 MPa. When the internal pressure in the clad is too high, there is a fear that the clad bursts during the production process.

The lower limit $P_L$ of the pressure in the clad is usually decided by the following equation:

$$P_L = E \times t/r \qquad (1)$$

where E is an elastic modulus of a clad material and t is an internal radius of a clad. When the pressure in the clad is smaller than the lower limit $P_L$ decided by the equation (1), there is a fear that the clad can not be shrunk with volume reduction, which accompanies the polymerization reaction of the monomer, because of too small expansion of the clad under pressure. On the other hand, when the pressure in the clad is too small, there is a fear that volume reduction caused by the initial polymerization of the polymer can not be compensated by the unpolymerized monomer, thereby making it impossible to effectively prevent generation of air gap. Accordingly, the pressure in the clad satisfies the equation (1) and is usually set to 0.05 MPa or more, preferably 0.07 MPa or more, particularly preferably 0.1 MPa or more.

The temperature of the heating bath (water bath for polymerization) varies depending on the reactivity of the monomer, physical properties of the clad, and feed rate (i.e. residence time in the heating bath) of the clad filled with the monomer, but is usually from 35 to 90° C., and preferably from 40 to 85° C. When the temperature is too low, there is a fear that expansion and shrinkage of the clad can not be conducted uniformly and smoothly, thereby making it possible to shrink the clad with volume reduction of the core. To the contrary, when the temperature is too high, there is a fear that it becomes impossible to neglect thermal expansion of the core after the completion of the reaction, thereby making it difficult to shrink the clad with volume reduction after removing from the heating bath. As described above, a shrinking operation of the clad can also be conducted effectively by particularly providing the slow-cooling region of the clad. However, it is preferred that such a slow-cooling region is not provided particularly so as to simplify the production process and operation, thereby to enhance the production efficiency. From such a point of view, the temperature of the heating bath is preferably within a range from 45 to 65° C.

The time of the clad filled with the monomer to be resided in the heating bath (residence time) is not specifically limited, but is usually from 10 minutes to 5 hours, and preferably from 15 minutes to 3 hours. The length of the clad used for production is usually from 10 to 3000 m, and preferably from 20 to 2000 m.

[Light Fiber]

The light fiber according to the present invention comprises a clad formed as described above, and a core coated with the clad.

The core usually extends in the lengthwise direction of the core. The peripheral surface of the core is coated with the clad with being closely contacted with the core, both ends of the core being exposed. Light from a light source can be introduced into the core from exposed one end or both ends of the core without causing loss. The core has light transmittance in such a level as to make it possible to transmit incident light incident upon the core from one end to the other end.

The core is a solid core made of a pliable plastic. As the pliable plastic, for example, polymers having light transmittance and pliability, such as acrylic polymer, ethylene-vinyl acetate copolymer, vinyl acetate-vinyl chloride copolymer and the like, can be preferably used alone. Alternatively, two or more kinds of them can be used in combination. The refractive index of the plastic constituting the core is usually from 1.4 to 1.7, while the total light transmittance is usually 80% or more. The polymer can be crosslinked to secure sufficient heat resistance of the core itself.

As the filler material as a raw material of the core, for example, an acrylic monomer can be used. Specific examples of the acrylic monomer include n-butyl methacrylate, triethylene glycol dimethacrylate, methyl methacrylate, methyl acrylate, 2-hydroxyethyl methacrylate, n-propyl methacrylate, phenyl methacrylate, 2-ethylhexyl methacrylate, ethyl acrylate, tridecyl methacrylate, dodecyl methacrylate and the like.

As a crosslinking agent for crosslinking the material of the core, for example, polyfunctional monomers such as diallyl phthalate, triethylene glycol di(meth)acrylate, diethylene glycol bisallyl carbonate and the like can be used.

The length of the core in the light fiber is usually the same as that of the clad, and is usually from 50 to 100 m. Usually, the cross section of the core in the radial direction is generally in a circular or ellipsoidal form, but may be in any other shape as far as the effect of the present invention is not impaired.

The light fiber according to the present invention can enhance the light emission efficiency while sufficiently utilizing conventional characteristics (flexibility and durability) of the light fiber. Accordingly, the light fiber can be used, for example, as constituent parts of light emitting devices which can be suitably used in illuminator in the place separated from a light source, illumination, advertising display, variable display and road traffic sign. That is, the light fiber according to the present invention can effectively used in an end light emitting mode capable of emitting light, introduced into the core from one end, from the other end, and a side light emitting mode capable of emitting (light leakage) light from the side (peripheral surface) of the core.

As the light source, for example, high luminance lumps such as xenone lamp, halogen lamp, flush lamp and the like can be used advantageously. Waste of electric power of the lamp is usually from 10 to 500 W. Sunlight may be introduced into the core from one end after focusing.

EXAMPLES

The present invention will be described with reference to the following examples and comparative examples.

Examples 1 to 5

Under the production conditions described in the following Table 1, optical fibers of the respective examples were produced in accordance with the following production procedure. A production apparatus used in each example was the same as that described previously with reference to FIG. 1 and was equipped with a water bath for polymerization disposed horizontally (length in horizontal direction: 4.2 m). In Example 5 wherein the temperature of the water bath for polymerization was raised to 80° C., the resulting product was wound around a winding apparatus after a slow-cooling operation of a clad was carried out.

[Production Procedure]

As a clad material, a tetrafluoroethylene-hexafluoropropylene copolymer manufactured from Mitsui Du Pont Co. under the trade name of FEP100J was used. This clad material was molded by using an extruder having a diameter ($\phi$) of 50 mm and L/D of 26 to obtain a long size clad tube.

The resulting clad was cut into pieces having a length of 30 m, and the cut clad was filled with a core forming material under pressure. The core forming material used herein is that prepared by adding bis(4-t-butylcyclohexyl) peroxydicarbonate as a polymerization initiator to a polymerizable monomer (mixed solution of n-butyl methacrylate and triethyleneglycol dimethacrylate in a weight ratio of 100:1). The monomer in the clad was polymerized under the conditions as described in the following Table 1. In that case, the monomer was continuously polymerized in the clad, and the clad and the core were closely contacted with each other by shrinkage of the clad to produce a desired light fiber.

[Produced Light Fiber]

In each of Examples 1 to 5, the clad can be shrunk on volume shrinkage, which accompanies the polymerization reaction of the monomer, thus obtaining a light fiber wherein any air gap is not observed between the core and the clad (that is, the number of air gap defined described above is zero).

Comparative Example 1

In Comparative Example 1, a light fiber was produced in the same manner as in Example 1, except that the same clad as in Example 1 was used and the pressure in the clad was lowered. The production conditions are as described in the following Table 1.

Since expansion of the clad was not sufficient as compared with the volume reduction of the monomer, the clad could not be shrunk with volume reduction of the core, which accompanies the reaction of the filler material. As a result, the number of air gap measured by the method described above was about 10 per 10 m.

Comparative Example 2

In Comparative Example 2, a light fiber was produced in the same manner as in Example 1, except that the same clad as in Example 3 was used and the residence time in the water bath for polymerization was reduced to half. The production conditions are as described in the following Table 1.

In this example, the polymerization of the monomer was not completed in the water bath for polymerization and volume reduction of the core occurred with proceeding of the polymerization after removing from the water bath for polymerization. After removing from the water bath for polymerization, the clad could be shrunk dimensionally, however, the clad could not be shrunk with volume reduction of the core at room temperature (about 25° C.) outside the water bath for polymerization. As a result, the number of air gap measured by the method described above was about 10 per 10 m. By further heating after removing from the water bath for polymerization under the conditions of Comparative Example 2, it becomes possible to shrink the clad with volume reduction of the core, thereby forming a light fiber which is free from air gap.

TABLE 1

|  |  | Example 1 | Example 2 | Example 3 | Example 4 | Example 5 | Comp. Example 1 | Comp. Example 2 |
|---|---|---|---|---|---|---|---|---|
| Elastic modulus of FEP: E | MPa | 361.6 | 361.6 | 361.6 | 361.6 | 154.62 | 361.6 | 361.6 |
| Temperature of polymerization bath: T | ° C. | 55.0 | 55.0 | 55.0 | 55.0 | 80.0 | 55.0 | 55.0 |
| Residence time in polymerization bath: t | h | 1.0 | 1.0 | 1.0 | 1.0 | 1.0 | 1.0 | 0.5 |
| Diameter: D | mm | 5.50 | 9.80 | 12.80 | 18.80 | 12.80 | 5.50 | 12.80 |
| Thickness of clad material: t | mm | 0.25 | 0.35 | 0.35 | 0.45 | 0.50 | 0.25 | 0.35 |
| Nitrogen pressure: P | MPa | 0.55 | 0.45 | 0.35 | 0.30 | 0.35 | 0.35 | 0.35 |

TABLE 1-continued

|  |  | Example 1 | Example 2 | Example 3 | Example 4 | Example 5 | Comp. Example 1 | Comp. Example 2 |
|---|---|---|---|---|---|---|---|---|
| Internal radius: r | mm | 2.75 | 4.90 | 6.40 | 9.40 | 6.40 | 2.75 | 6.40 |
| Thickness/internal radius: t/r | — | 0.09 | 0.07 | 0.05 | 0.05 | 0.08 | 0.09 | 0.05 |

As described above, according to the present invention, since a filler material was reacted in a clad expanded under pressure and the clad was shrunk in conformity with volume reduction of the core, which accompanies the reaction of the filler material, the portion of the boundary between the polymerized portion and the unpolymerized portion in the clad is formed in a comparatively large width during the reaction of the core (monomer), thereby making it possible to substantially eliminate air gap at the interface between the core and the clad even in case where volume reduction of the polymerized core occurs in the range where an influence of the pressure from the unpolymerized portion side is not exerted. Accordingly, according to the present invention, a long size light fiber can be continuously produced in a stable and easy manner.

What is claimed is:

1. A method of producing a light fiber comprising (a) a tubular clad having a predetermined length and (b) a solid core formed by reacting a filler material filled in the clad, the clad and the core being closely contacted with each other by shrinkage of the clad, said method comprising the steps of:

forming the clad which is expandable under pressure, filling the clad with the filler material and reacting the filler material in the clad while applying a pressure, initiating a shrinking operation of the clad before the completion of the reaction of the filler material, and shrinking the clad with volume reduction of the core, which accompanies the reaction of the filler material.

2. The method of producing a light fiber according to claim 1, wherein the light fiber is continuously produced by the steps of:

(A) feeding the clad from a feeding means, on which the clad is wound, using winding means, thereby transferring the filler material, with which the clad is filled, to a heating region, (B) initiating, carrying out and completing the reaction of the filler material in the heating region, (C) initiating a shrinkage operation of the clad in the heating region, and (D) winding the resulting light fiber after the shrinking operation of the clad has substantially been completed, using a winding means disposed outside the heating region.

* * * * *